Jan. 21, 1930. F. H. SMITH 1,744,339
VULCANIZING PRESS
Filed March 10, 1928  2 Sheets-Sheet 2

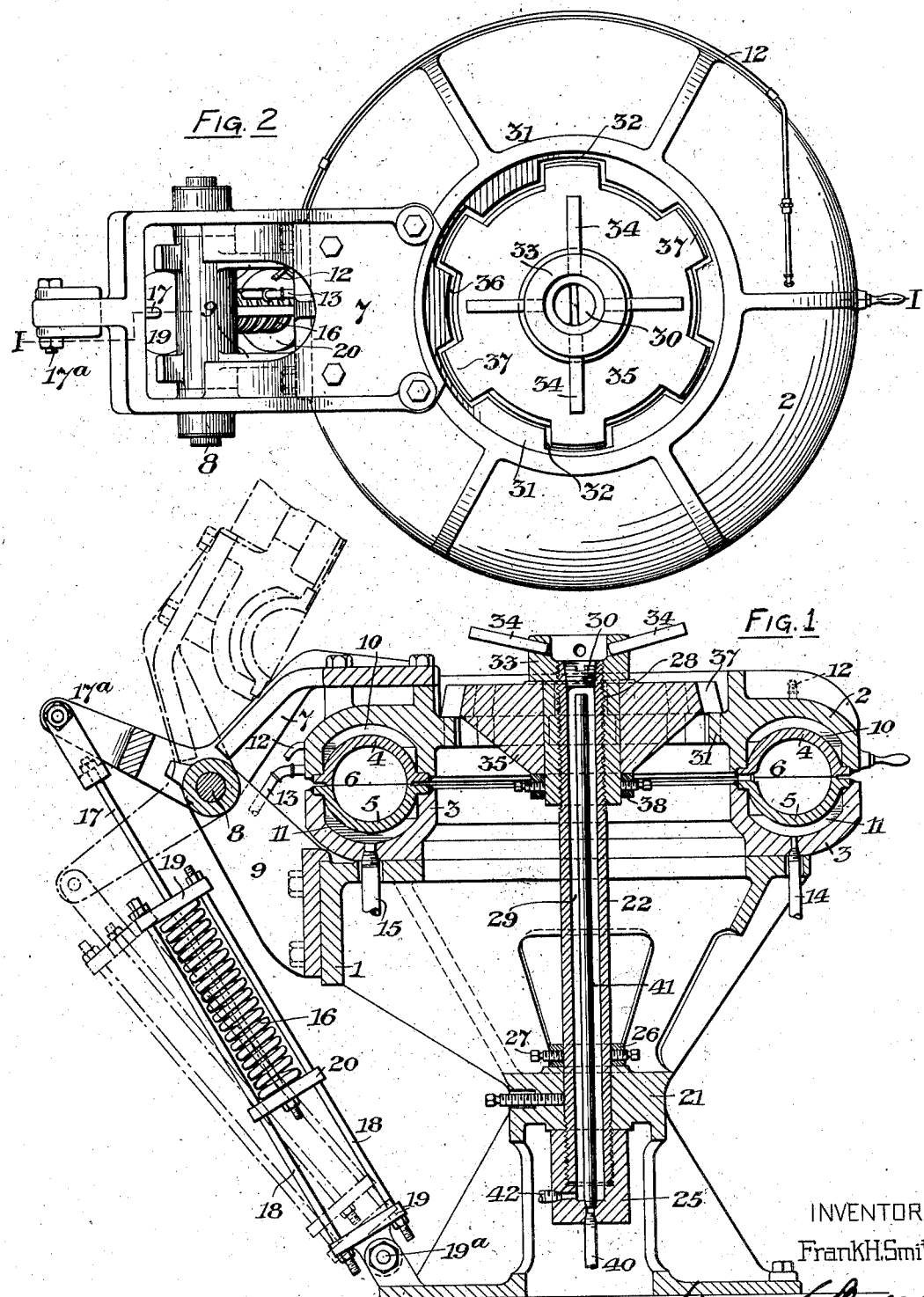

INVENTOR:
Frank H. Smith
by Murray C. Boyer
Atty.

Patented Jan. 21, 1930

1,744,339

UNITED STATES PATENT OFFICE

FRANK H. SMITH, OF PHILADELPHIA, PENNSYLVANIA

VULCANIZING PRESS

Application filed March 10, 1928. Serial No. 260,667.

My invention relates to presses employed for vulcanizing inner tubes, tires, and articles of a similar nature, in which the pressure for inflating the tube or other article and holding the same against the walls of the mold chamber of the press may be effected by a fluid, usually an expansive fluid body disposed within the article to be vulcanized and wherein, during the vulcanizing treatment, it is necessary to hold the sections of the mold in rigid engagement to insure proper formation and curing of the tube or other article and without danger of forming fins, which would occur if the meeting faces of the mold sections were not in actual contact during the vulcanizing process.

One object of my invention is to provide an improved form of mold structure comprising steel lining members providing the desired cross sectional contour, which are secured to the sections of the mold body and in spaced relation thereto to provide the necessary room for the heating medium.

A further object of my invention is to secure the steel lining members to the sections of the mold structure by a welding operation.

A further object of my invention is to provide an improved form of clamping means for holding the sections of the mold structure together.

A further object of my invention is to increase the holding contact of the sections of the mold structure by contracting a member forming part of the clamping means; the latter being adjustable to engaging and disengaging positions with respect to the mold structure.

And a still further object of my invention is to provide means whereby one member of the clamping means may be expanded by a temperature change to release it from engagement with one of the sections of the mold structure.

These and other features of my invention are more fully described hereinafter; reference being had to the accompanying drawings, in which:

Figure 1 is a sectional elevation of a vulcanizing press taken on the line I—I, Fig. 2, showing the respective halves of the mold structure provided with steel liners within the scope of my invention and also showing my improved clamping means; the sections of the mold structure being in the closed position.

Fig. 2 is a plan view of the structure shown in Fig. 1.

Figure 4:
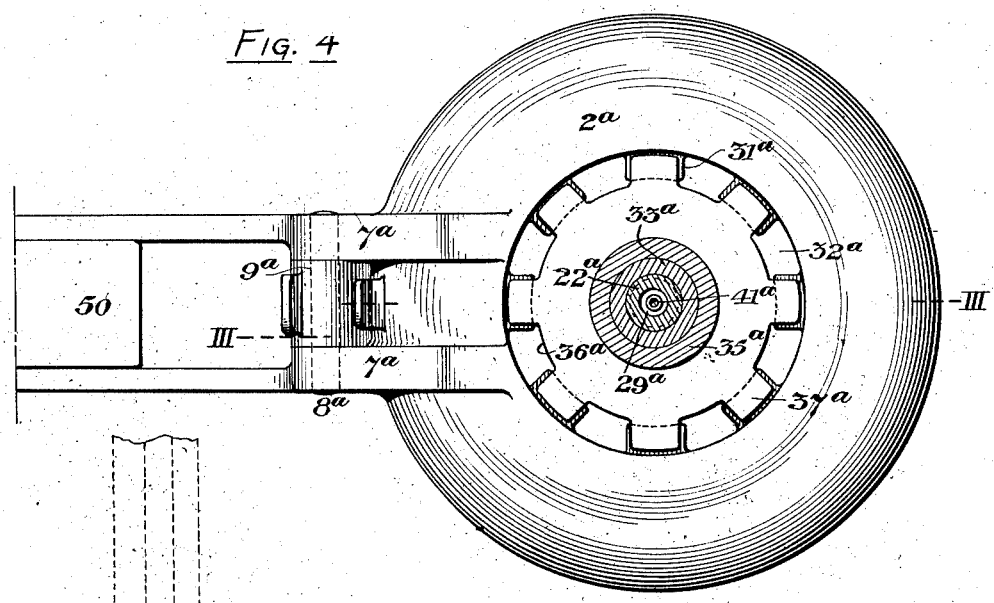
Fig. 4 is a plan view of the structure shown in Fig. 3, partly in section on the line IV—IV.

The press mold structure to which my improved clamping means has been applied may comprise a suitable frame or stand 1, supporting upper and lower sections 2 and 3 of a mold body, having steel liners 4 and 5, which liners are spaced from the sections 2 and 3, and provide the usual cavity 6 for the reception of inner tubes and similar articles undergoing a vulcanizing operation; said liner sections having matching faces for engagement with each other. The supporting frame may be of any ordinary or usual type commonly employed at the present time.

In the form of structure shown in Figs. 1 and 2, the upper section of the mold body is provided with a bracket 7, suitably secured thereto and hinged at 8 to a bracket 9 carried by the lower section 3, whereby it may be swung into and out of position with respect to the lower section when it is desired to place a tube or other article in the mold cavity of the liners before curing, or when such vulcanized tube or other article is to be removed therefrom; the open position being indicated by dotted lines.

The respective sections of the mold body are hollow; the walls of the same being spaced from the liners 4 and 5, whereby annular spaces or chambers 10 and 11 are provided, and suitable connections 12 and 13, and 14 and 15 are provided for the introduction and exhaust of steam or other suitable heating medium to and from these chambers.

The bracket 7 of the upper section of the mold structure which is hinged to the bracket 9 of the lower section, is operatively connected to suitable counterbalancing means which also serve to open the sections of the mold structure when the clamping means are released, comprising an expansion spring 16 held under compression when the sections of the mold structure are in the closed position. This structure includes a spring-carrying frame consisting of rods 17 and 18, connected to cross-heads 19 and 20; one of said cross-heads being pivotally connected at 19ᵃ to the base of the press frame, while the rod 17 is pivotally connected at 17ᵃ to the arm 7ᵃ of the bracket 7.

The lower portion of the frame 1 is provided with a web 21, and centrally disposed with respect to said web 21, and the sections of the mold structure, is a hollow rod or stem 22, which may be threaded into a block 25 below the web 21, and held in place with respect thereto by a collar 26 and set screws 27. The upper end of said rod or stem is externally threaded as indicated at 28, and its recess or chamber 29 may extend throughout its length.

If the rod or stem is hollow throughout its length, its upper end will be closed by a plug such as indicated at 30 for a purpose hereinafter described.

The sections of the mold structure are substantially circular, and the upper mold section may be provided with an interrupted flange whereby lugs 31 are formed, with spaces 32 between the same. Mounted on the threaded portion 28, of the rod 22, is a nut 33, which may have suitable operating handles 34, and this nut carries a clamping cap 35, having an interrupted edge which is recessed at 36, providing projections or lugs 37, which lugs and recesses match the recesses and lugs in the interrupted flange of the upper mold section. These parts are in such relation to each other that rotary movement imparted to the clamping cap with respect to the upper mold section will bring the projecting parts of the respective members into and out of contact; in the one instance the cap being in engagement with the upper section of the mold body and clamping the same to the lower section of the mold body, and in the other position released from such engagement so as to permit the upper mold section to be swung out of the way on its hinged connection. The clamping cap is held in position with respect to the nut by a collar 38.

When the cap member 35 is in position with its lugs or projections 37 in engagement with the lugs 31 of said upper section of the mold body, it may be moved into clamping contact therewith by rotating the nut 33, which may be movable relatively to the clamping cap, and to increase this pressure and insure perfect contact between the sections of the mold body and their liners I propose to contract said rod or stem 22 by effecting changes in the temperature of the same.

For this purpose, the lower end of said rod is provided with an inlet 40 in communication with a source of a suitable temperature controlling medium in order that it may be delivered to said rod or stem for effective action thereon. To this end I provide a so-called lance pipe 41, disposed within the chamber of the hollow rod 22 and extending substantially to the upper end of said chamber whereby the temperature controlling medium may be introduced and circulated through said rod or stem 22; the block 25 receiving the lower end of the same being connected to a discharge pipe 42 whereby such temperature controlling medium may be run to waste or otherwise disposed of as may be desired.

To contract said stem 22 and thereby increase the holding pressure effected by the clamping cap 35 to which said stem is connected, cold water may be introduced into the same, and when it is desired to release the pressure in order that the cap may be turned and so disposed with respect to the upper section of the mold body as to permit opening of the same, a heating medium is introduced into said rod or stem; the coefficient of expansion and contraction of said stem 22, being sufficient to cause the clamping cap to exert a tight grip upon the upper mold section, in the one instance, and to release it, in the other instance, so that it may be raised sufficiently by rotation of the nut to permit rotative movement whereby its lugs or projections may be displaced with respect to the lugs or projections of said upper mold section preliminary to opening the press. Any elongation of said rod or stem 22, due to alternate cooling and heating of the same will be compensated for since under such circumstances the nut 33 will simply take up a greater amount of the threaded portion of said rod or stem 22.

Figure 3:
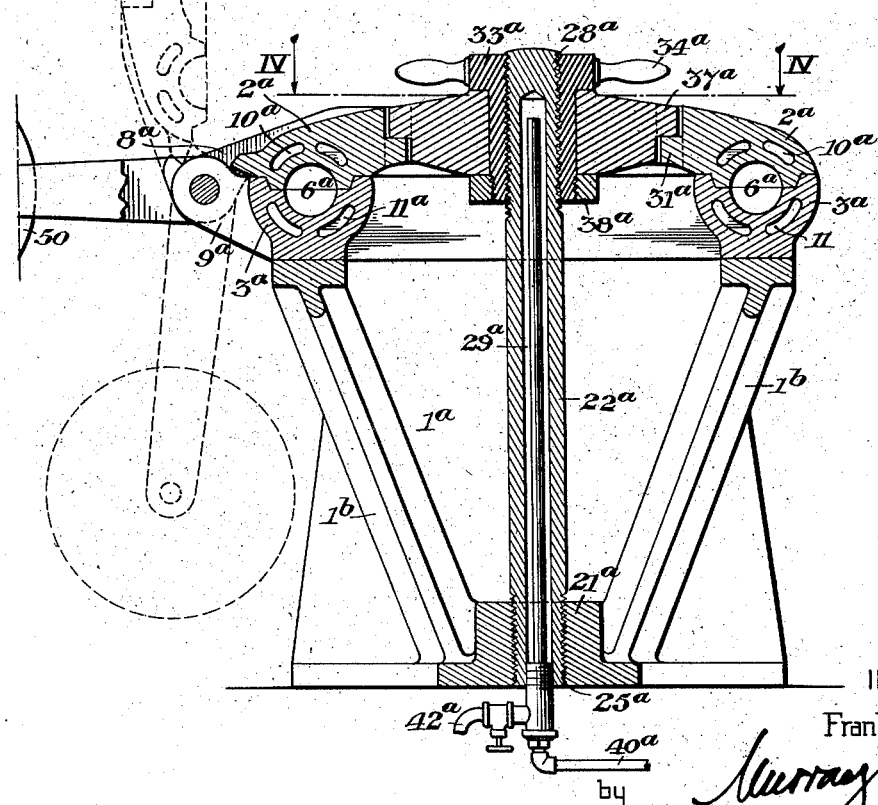
Fig. 3 is a sectional view, similar to Fig. 1, taken on the line III—III, Fig. 4, showing another form of my improved clamping means.

The press mold structure shown in Figs. 3 and 4, and to which my improved clamping means have been applied may comprise a suitable frame or stand 1ᵃ, supporting upper and lower sections 2ᵃ and 3ᵃ of a mold structure available for the curing of inner tubes and similar articles; said sections having matching faces for engagement with each other.

In this structure, the upper and lower sections are hinged together at 8ᵃ, whereby said upper section may swing into and out of position with respect to the lower section when it is desired to place a tube or other article in the mold cavity of the press before curing, or when the vulcanized tube, or other article is to be removed therefrom; the open position being indicated by dotted lines.

The respective mold sections are hollow, being provided with chambers 10ᵃ and 11ᵃ, and suitable connections are provided for the introduction of steam or other suitable heating medium to these chambers. The upper section 2ª which is hinged to the lower mold section 3ª, may be operatively connected to a suitable counterbalance weight 50, which may be connected to an extension of its hinge structure.

The frame 1ª, may be provided with suitable supporting legs 1ᵇ, and the lower portion of the base to which such legs are connected may be provided with a web 21ª. Centrally disposed with respect to said web and the sections of the mold, is a rod or stem 22ª, which may be threaded at 25ª into the web while the upper end of said rod or stem 22ª is externally threaded as indicated at 28ª. A portion of this rod or stem 22ª, is tubular; being provided with a recess 29ª.

As in the structure shown in Figs. 1 and 2, the mold sections are substantially circular, and the upper mold section may be provided with an interrupted flange internally disposed whereby lugs 31ª are formed, with spaces 32ª between the same. Mounted on the threaded portion 28ª, of the rod 22ª, is a nut 33ª, which may have suitable operating handles 34ª, and this nut carries a clamping cap 35ª, having an interrupted edge which is recessed at 36ª, providing projections or lugs 37ª, which lugs and recesses match the recesses and lugs in the interrupted flange of the upper mold section. These parts are in such relation to each other that rotary movement imparted to the clamping cap with respect to the upper mold section will bring the projecting parts of the respective members into and out of contact; in the one instance, the clamping cap being in engagement with the upper mold section and clamping the same to the lower mold section, and in the other position released from such engagement so as to permit the upper mold section to be swung out of the way on its hinged connection.

When the cap member 35ª is in position with its lugs or projections 37ª in engagement with the lugs 31ª of said upper section, it may be moved into clamping contact therewith by rotating the nut 33ª, and to increase this pressure and insure perfect contact between the mold sections, I propose to contract said rod or stem 22ª, by effecting changes in the temperature of the same, as in the structure illustrated in Figs. 1 and 2. For this purpose, the lower end of said rod 22ª is connected to a so-called lance pipe 41ª, which may extend substantially to the upper end of the recess 29ª, in said rod or stem 22ª, whereby the temperature controlling medium may be introduced and circulated by the same, the lower end of said rod or stem 22ª, being also connected to a discharge pipe 42ª whereby such temperature controlling medium may be run to waste or otherwise disposed of as may be desired.

The operation of increasing the grip of the clamping means upon the mold sections by circulating a cooling medium through the tubular stem 22ª, or of effecting release of such clamping means by the circulation of a heating medium, is the same as that described with reference to the structure shown in Figs. 1 and 2.

I claim:

1. In a vulcanizing press, the combination with the mold sections, of clamping means for holding said sections in contact with each other, and means for expanding or contracting said clamping means by the circulation of temperature controlling media with respect to a portion of the same.

2. In a vulcanizing press, the combination with the mold sections, of mechanical clamping means for holding said sections in contact with each other, and means for expanding or contracting said clamping means by the circulation of temperature controlling media with respect to a portion of the same.

3. In a vulcanizing press, the combination with upper and lower mold sections, of mechanical clamping means for holding said sections in contact with each other, and means for expanding or contracting said clamping means by the circulation of a temperature controlling medium with respect to a portion of the same.

4. In a vulcanizing press, the combination with upper and lower mold sections, of mechanical clamping means for holding said sections in contact with each other including a hollow tube supporting a portion of said clamping means, and means for expanding or contracting said clamping means by circulating a temperature controlling medium through said hollow tube.

5. In a vulcanizing press, the combination with upper and lower mold sections, of mechanical clamping means for holding the same together including a tubular stem mounted in fixed position with respect to said mold sections and a cap carried by said stem and movable into and out of engagement with one of said mold sections, and means for expanding or contracting said stem by circulating fluid temperature-controlling media therethrough.

6. In a vulcanizing press, the combination with upper and lower mold sections, of mechanical clamping means for holding the same together comprising a fixed stem having a tubular portion and threaded at its upper end, a nut carried by the threaded portion of said stem, a clamping member supported by said nut and engaging the upper mold section, and means for expanding or contracting said stem by circulating fluid temperature-controlling media therethrough.

7. In a vulcanizing press for inner tubes and similar articles, the combination of upper and lower mold sections annular in form, a centrally disposed clamping member for holding said mold sections together, a central stem, a nut threaded on said stem and carrying said clamping member; the latter being movable into and out of clamping position with respect to the upper mold section, means for turning the nut so as to move the clamping member into contact with the upper mold section, and means for contracting said stem to increase the pressure exerted by said clamping member upon the upper mold section.

8. In a vulcanizing press for inner tubes and similar articles, the combination with upper and lower mold sections annular in form, of a centrally disposed clamping member for holding said mold sections together, a central stem having a hollow portion, a nut threaded on said stem and carrying said clamping member; the latter being movable into and out of engaging position with respect to the upper mold section, means for turning the nut so as to hold the cap in gripping engagement with the upper mold section, and means for contracting said stem by circulating a cooling medium through the same to increase the pressure exerted by said clamping member upon the upper mold section.

9. In a vulcanizing press, the combination with upper and lower mold sections, of a central stem mounted in relatively fixed position and substantially centrally of said mold sections, a clamping member for holding said sections together carried at the upper end of said stem, a nut threaded on said stem and supporting the clamping member; said stem being hollow; the clamping member being movable into and out of engagement with the upper mold section, means for turning the nut so as to hold said clamping member in rigid engagement with the upper mold section, and means for circulating temperature controlling media through said hollow stem for the purpose of increasing or decreasing the pressure exerted by the clamping member upon said upper mold section.

10. In a vulcanizing press, the combination with the upper and lower mold sections, of a central stem mounted in relatively fixed position and substantially centrally of said mold sections, a clamping member for holding said sections together carried at the upper end of said stem; said upper mold section having inwardly extending projections and said clamping member having projections adapted to engage the projections carried by the upper mold section; there being spaces between the projections of the respective parts for the passage of the projections on said clamping member when the latter is disengaged, a nut threaded on the stem and supporting said clamping member; said stem being hollow and said clamping member being movable into and out of engagement with the upper mold section, means for turning said nut so as to hold said clamping member in rigid engagement with the upper mold section, and means for circulating temperature controlling media through said hollow stem for the purpose of increasing or decreasing the pressure exerted by the clamping member upon said upper mold section.

11. In a vulcanizing press, the combination with upper and lower mold sections, of a support for the lower mold section, a central tubular stem secured to said support, said tubular stem being externally threaded at its upper end, a nut adapted to the threaded portion of said stem, a clamping member supported by said nut and movable thereby into contact with the upper mold section; said nut carrying said clamping member into clamping position, and means for circulating a temperature-controlling medium through the hollow portion of said stem for the purpose of contracting or elongating the same to increase or release the pressure exerted by the clamping member upon the upper mold section.

12. In a vulcanizing press, the combination with upper and lower mold sections, of a support for the lower mold section, a central tubular stem secured to said mold support; said tubular stem being externally threaded at its upper end, a nut adapted to the threaded portion of said stem, a clamping member supported by said nut and movable with respect thereto into and out of contact with the upper mold section; said nut serving also to hold the clamping member in clamping position, and means for circulating a heating medium through the hollow portion of said stem for the purpose of elongating the same to release the pressure exerted upon the clamping member.

In witness whereof I have signed this specification.

FRANK H. SMITH.